US 8,739,772 B2

(12) United States Patent
Davis et al.

(10) Patent No.: US 8,739,772 B2
(45) Date of Patent: Jun. 3, 2014

(54) GRILL WITH MULTI-SIDED ACCESS

(75) Inventors: Mark Davis, Midland, GA (US); Paul A. Reeder, Worthington, OH (US); Wesley J. Wagner, Columbus, GA (US); Jose Raul Mendez, Columbus, OH (US); Andrew Wolf Kahler, Fortson, GA (US)

(73) Assignee: W.C. Bradley Co., Columbus, GA (US)

( * ) Notice: Subject to any disclaimer, the term of this patent is extended or adjusted under 35 U.S.C. 154(b) by 1222 days.

(21) Appl. No.: 12/568,381

(22) Filed: Sep. 28, 2009

(65) Prior Publication Data

US 2010/0078009 A1    Apr. 1, 2010

Related U.S. Application Data

(60) Provisional application No. 61/100,580, filed on Sep. 26, 2008.

(51) Int. Cl.
*A47J 37/07* (2006.01)
*F24B 1/182* (2006.01)
*F24B 1/26* (2006.01)

(52) U.S. Cl.
USPC .......... 126/37 R; 126/25 R; 126/29; 126/9 R; 126/39 B; 99/450; 99/449; 99/339; D7/334; D6/698

(58) Field of Classification Search
CPC ....... A47J 37/07; A47J 37/0781; F24B 1/207; F24B 3/00; F24B 13/02; F24B 1/182; F24B 1/26
USPC ........ 126/25 R, 29, 30, 9 R, 9 B, 37 R, 37 A, 126/37 B, 39 B, 41 R, 40; 99/450, 449, 339, 99/340, 467; D7/334, 332, 339, 347, 403; D6/698; 220/212, 212.5, 810, 817, 220/819, 826, 831, 345.1, 345.6, 23.83, 220/23.86; 108/13, 14, 17, 23, 38, 93; 312/21–30, 140.2, 205
See application file for complete search history.

(56) References Cited

U.S. PATENT DOCUMENTS 416,068 A * 11/1889 Muller ......................... 126/25 R
651,178 A *  6/1900 Borton et al. ................... 312/30
(Continued)

FOREIGN PATENT DOCUMENTS

GB    2233547 A *  1/1991  ............. A47J 37/07
GB    2365320 A *  2/2002  ............. A47J 37/07
(Continued)

*Primary Examiner* — Kang Hu
*Assistant Examiner* — Daniel E Namay
(74) *Attorney, Agent, or Firm* — Fellers, Snider, Blankenship, Bailey & Tippens, P.C.

(57) ABSTRACT

A grill has a base that supports a grill body. A right and left lid are hingedly affixed to the grill body. The lids interconnect to ensure that they open and close together. A plurality of vents is defined by an upper surface of the lids. A shelf having a right portion, a left portion, and a rear portion substantially surrounds the grill body except for the operator position to the front of the grill body. The shelf and the right side of the grill body define a right retracting space. The shelf and the left side of the grill body define a left retracting space. The lids pivot outwards into the left and right retracting spaces to retracted positions wherein the uppermost portions of the lids and the uppermost surface of the grill body are substantially even with or below an upper surface of said shelf.

1 Claim, 13 Drawing Sheets

(56) References Cited

U.S. PATENT DOCUMENTS

| | | | | |
|---|---|---|---|---|
| 701,782 A * | 6/1902 | White | | 108/86 |
| 948,717 A * | 2/1910 | Avery | | 126/25 R |
| 998,208 A * | 7/1911 | Scrote | | 126/37 R |
| 1,391,115 A * | 9/1921 | Hudson | | 108/63 |
| 1,438,345 A * | 12/1922 | Tait et al. | | 126/9 R |
| 1,602,247 A * | 10/1926 | Oster | | 190/12 R |
| 1,931,334 A * | 10/1933 | Teller et al. | | 126/42 |
| 2,244,168 A * | 6/1941 | Miller | | 99/337 |
| 2,258,782 A * | 10/1941 | McKean | | 5/623 |
| 2,419,344 A * | 4/1947 | Eggleston | | 126/25 R |
| 2,455,154 A * | 11/1948 | Bailey | | 312/272 |
| 2,474,043 A * | 6/1949 | Etches | | 126/9 R |
| 2,547,754 A * | 4/1951 | Herrick | | 312/208.4 |
| 2,582,703 A * | 1/1952 | Kirshbaum | | 297/144 |
| 2,607,651 A * | 8/1952 | Preuss | | 312/30 |
| 2,885,950 A * | 5/1959 | Stoll et al. | | 99/340 |
| 2,948,798 A * | 8/1960 | Ness | | 219/387 |
| D192,199 S * | 2/1962 | Watson | | D7/334 |
| 3,059,632 A * | 10/1962 | Rogers | | 126/37 R |
| 3,581,731 A * | 6/1971 | Schulze | | 126/25 R |
| 3,781,074 A * | 12/1973 | Trueblood | | 312/30 |
| 3,899,961 A * | 8/1975 | Tanguy | | 99/340 |
| 4,076,008 A * | 2/1978 | Deaton | | 126/25 R |
| 4,123,124 A * | 10/1978 | Peets | | 312/21 |
| 4,418,678 A * | 12/1983 | Erickson | | 126/9 R |
| 4,585,661 A * | 4/1986 | Brummett | | 426/520 |
| 4,635,613 A * | 1/1987 | Tucker et al. | | 126/25 R |
| 5,016,607 A * | 5/1991 | Doolittle et al. | | 126/25 R |
| 5,105,725 A * | 4/1992 | Haglund | | 99/446 |
| 5,160,288 A * | 11/1992 | Seda | | 446/482 |
| 5,165,384 A * | 11/1992 | Knutson | | 126/25 C |
| 5,165,385 A * | 11/1992 | Doolittle et al. | | 126/25 R |
| 5,313,928 A * | 5/1994 | Rodgers et al. | | 126/38 |
| 5,437,222 A * | 8/1995 | Franklin | | 99/450 |
| 5,528,984 A * | 6/1996 | Saurwein | | 99/482 |
| 5,579,755 A | 12/1996 | Johnston | | |
| 5,588,420 A * | 12/1996 | Dickson | | 126/25 R |
| 5,850,828 A * | 12/1998 | Valentino | | 126/25 R |
| 5,910,209 A * | 6/1999 | Lee | | 99/450 |
| 5,970,971 A * | 10/1999 | Wu | | 126/38 |
| D430,450 S * | 9/2000 | Chester | | D7/334 |
| D430,772 S | 9/2000 | Ganard | | |
| 6,182,560 B1 * | 2/2001 | Andress | | 99/400 |
| 6,189,528 B1 * | 2/2001 | Oliver | | 126/25 R |
| 6,199,474 B1 * | 3/2001 | Lee | | 99/450 |
| D450,524 S * | 11/2001 | Measom | | D7/332 |
| 6,397,731 B1 | 6/2002 | Gillespie et al. | | |
| 6,439,222 B1 | 8/2002 | Dixon et al. | | |
| 6,502,570 B2 * | 1/2003 | Grady | | 126/37 A |
| 6,508,165 B2 | 1/2003 | Johnson | | |
| 6,581,587 B1 * | 6/2003 | Helms | | 126/25 R |
| 6,595,198 B2 * | 7/2003 | Mosher et al. | | 126/38 |
| 6,681,759 B2 * | 1/2004 | Bentulan | | 126/25 R |
| 6,789,537 B1 * | 9/2004 | Lutz et al. | | 126/25 R |
| 7,296,564 B2 * | 11/2007 | Wilson | | 126/25 R |
| 7,810,485 B2 * | 10/2010 | Messmer | | 126/38 |
| D636,217 S * | 4/2011 | Slater et al. | | D7/334 |
| D657,183 S * | 4/2012 | May | | D7/334 |
| 8,381,712 B1 * | 2/2013 | Simms, II | | 126/25 R |
| 8,387,609 B2 * | 3/2013 | Olsen | | 126/25 R |
| 2001/0017131 A1* | 8/2001 | Sim | | 126/25 A |
| 2002/0014163 A1* | 2/2002 | Clark | | 99/446 |
| 2002/0189603 A1* | 12/2002 | Hsu | | 126/25 R |
| 2005/0217660 A1* | 10/2005 | Wilson | | 126/25 R |
| 2006/0193126 A1* | 8/2006 | Kuelbs et al. | | 362/155 |
| 2007/0089724 A1* | 4/2007 | Home | | 126/9 R |
| 2008/0257331 A1* | 10/2008 | Lockhart | | 126/192 |
| 2009/0056695 A1* | 3/2009 | Cosgrove | | 126/25 R |
| 2010/0024797 A1* | 2/2010 | Tsung | | 126/25 R |
| 2010/0024798 A1* | 2/2010 | Sampson | | 126/25 R |
| 2010/0083947 A1* | 4/2010 | Guillory et al. | | 126/25 R |
| 2010/0275898 A1* | 11/2010 | Jansson et al. | | 126/25 R |
| 2011/0203568 A1* | 8/2011 | Olsen | | 126/25 R |

FOREIGN PATENT DOCUMENTS

| | | | | |
|---|---|---|---|---|
| WO | WO 2008/104264 A1 * | 9/2008 | | A47J 37/07 |
| WO | WO 2010000111 A1 * | 1/2010 | | A47J 37/07 |

\* cited by examiner

GRILL WITH MULTI-SIDED ACCESS

CROSS REFERENCE TO RELATED APPLICATIONS

This application claims the priority of U.S. Provisional Patent Application No. 61/100,580 entitled "GRILL WITH MULTI-SIDED ACCESS," filed Sep. 26, 2009, the contents of which are hereby incorporated by reference.

FIELD OF THE INVENTION

The present invention relates to gas, charcoal and electric grills configured for outdoor use.

BACKGROUND OF THE INVENTION

Many gas, charcoal and electric grills currently configured for outdoor use have a similar structure. A round or rectangular cooking surface is oriented to face a standing operator position with cooking system controls in the front or to the side of the cooking surface. A hinged lid or cover is located such that it opens away from the operator position and is placed on the opposite side of the cooking surface from the operator. Surfaces for food preparation and handling are placed to the sides of the cooking surface or to the front either on fixed or folding shelves. Storage areas may be provided below the cooking surfaces or the shelves.

There are numerous limitations associated with the above-described configuration. First, shelf space is limited since the entire area behind the cooking surface is unavailable due to the space required for storage of the cooking surface lid or cover. Second, the operator cannot converse or interact with anyone facing him since that space is taken up by the lid, blocking vision if open and creating a hot surface in proximity to anyone there if open or closed. Third, when opening the cooking surface lid or cover, smoke and hot gases exit from the cooking chamber directly toward the operator, which prevents immediate vision or operation. Attempts to solve these problems have been limited.

In one case, U.S. Pat. No. 5,579,755 to Johnston and assigned to W.C. Bradley Company utilized angled cooking surfaces that were designed to create more shelf space on the sides. In another case, U.S. Pat. No. 6,508,165 to Johnson and assigned to Weber-Stephens Products Co. used a sliding shelf to extend the working surface. Neither of these solutions addressed the above mentioned second and third issues. In the cases discussed above, the grills are equipped with conventional cooking systems, the limitations of which will become apparent in the discussion of proposed solution below.

SUMMARY OF THE INVENTION

The grill of the invention has several features, each of which are believed to be novel or new to the art and which in combination completely address the three problems discussed above. The configuration of the cooking appliance is shown in the attached drawings and is described in the following description. A large shelf area surrounds three sides of the cooking appliance (gas, electric, or charcoal grill), leaving the fourth side for the operator standing position. The operator faces the cooking surface and the cooking system controls remain at the front or side relative to the operator. To enable the operator to converse or interact with other people, the cooking surface lid or cover has several unique features in addition to being of sufficient depth to allow slow cooking of large pieces of food and being capable of reducing heat loss from the cooking surface when closed.

First, the grill of the invention vents the flue gases and smoke through the upper surface of the lid when closed instead of through a slot in the back as is the common practice. Therefore, the flue gases and smoke do not impinge on space that might be occupied by an onlooker facing the operator.

Second, the grill of the invention has a lid that is constructed of two pieces. The lid is hinged so that the two pieces open to each side and pivot down and below the sides of the grill. Thus, when being opened, smoke and flue gas not fully vented exits vertically upward as the two lid halves open.

Third, when fully open, the lids are mostly or fully below the plane of the large shelf area and do not substantially interfere with vision or movement across the cooking surface and shelf areas. In some embodiments, the two lid halves are linked by a mechanism to produce coordinated action. One type is shown in the drawings but other configurations may also be used.

In other embodiments, surfaces may be slid or folded into position for covering the grill body and for providing a large work surface.

Recent developments in grill technology have features that reduce or eliminate the flare up of open flames caused by contact of meat fats or flammable sauces with hot surfaces of the cooking system. It will be readily apparent that the successful suppression of such open flames will encourage the use of the cooking appliance by the operator and by others standing around the shelf area in a position to converse or interact with the operator. Examples of inventions that achieve flare up suppression are described in publications including US Publication No. 20060021517 to Best and US Publication No. 20070125357 to Johnston.

DETAILED DESCRIPTION OF THE PREFERRED EMBODIMENTS

Grill 10 of the invention includes a base 12 having vertical legs 14. The base 12 has an operator side or front side 16, a right side 18, a left side 20, and a spectator side or rear side 22. Casters 24 are preferably affixed to the bottom of legs 14. Foot bar 26 may surround base 12 on right side 18, left side 20, and rear side 22 (FIGS. 1B, 2B), or may be located to span between adjacent legs 14 (FIGS. 1A, 1C, 2A, 3).

Figure 1A:
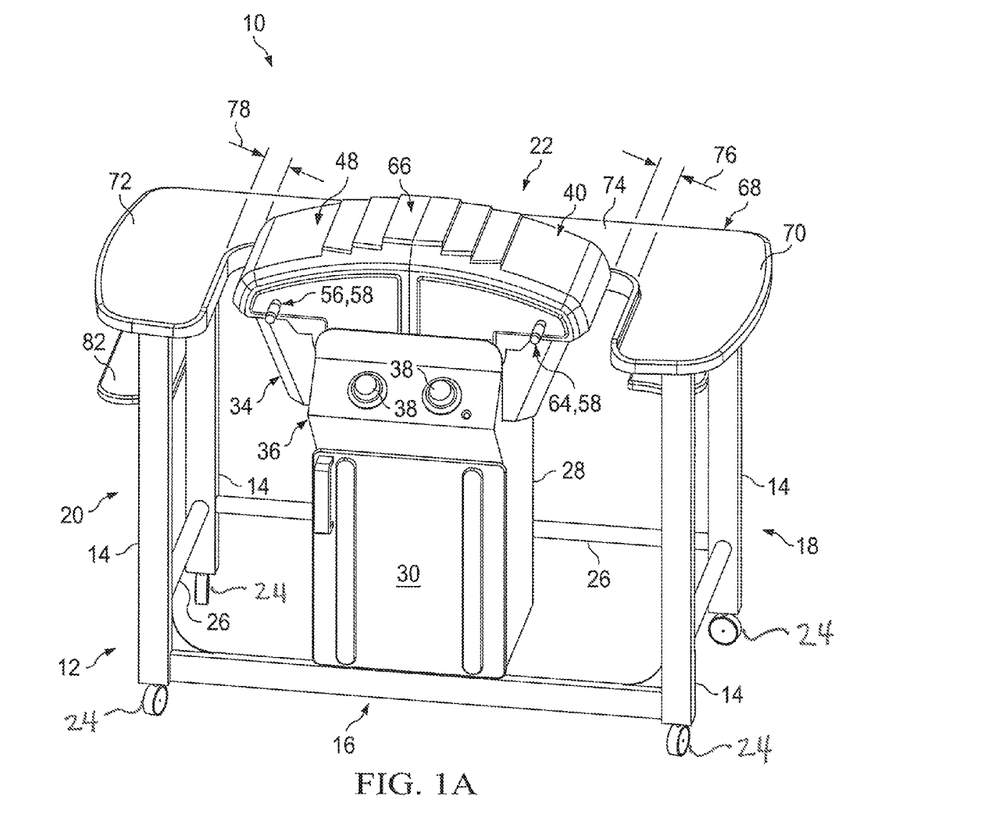
FIG. 1A is a perspective view of the grill of the invention in a "lid closed" configuration.
Figure 1B:
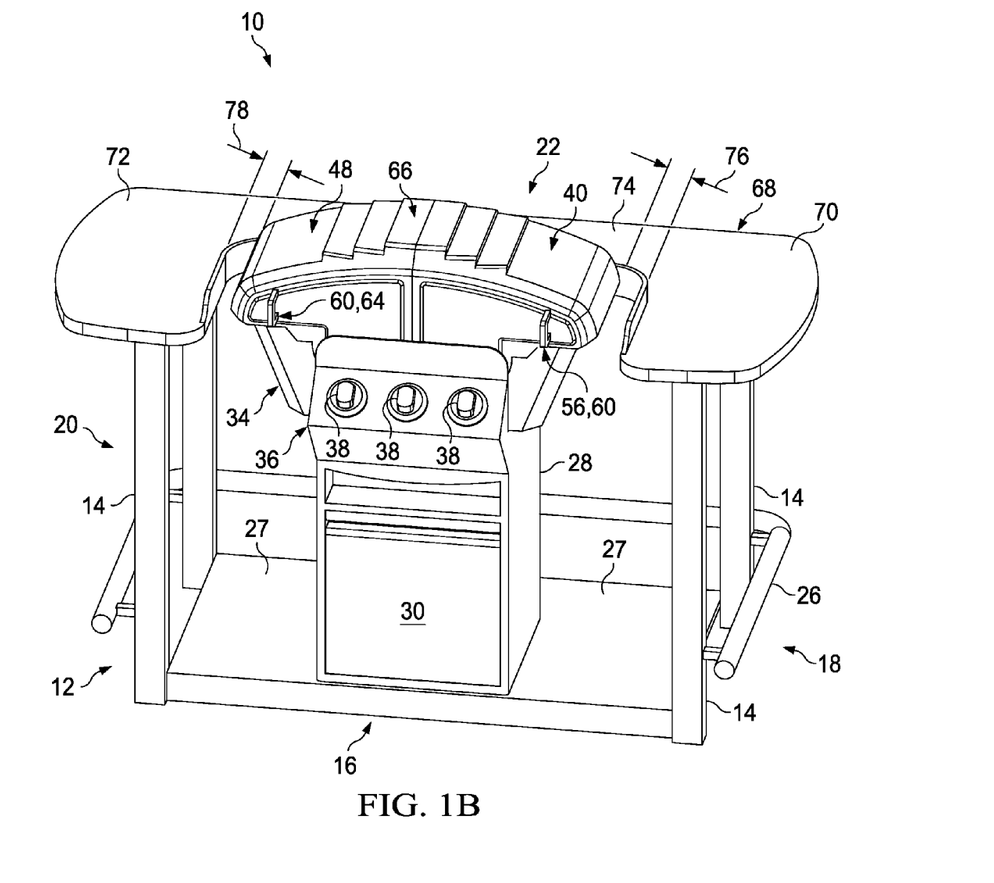
FIG. 1B is a perspective view of a second embodiment of the grill of the invention in a "lid closed" configuration.
Figure 1C:
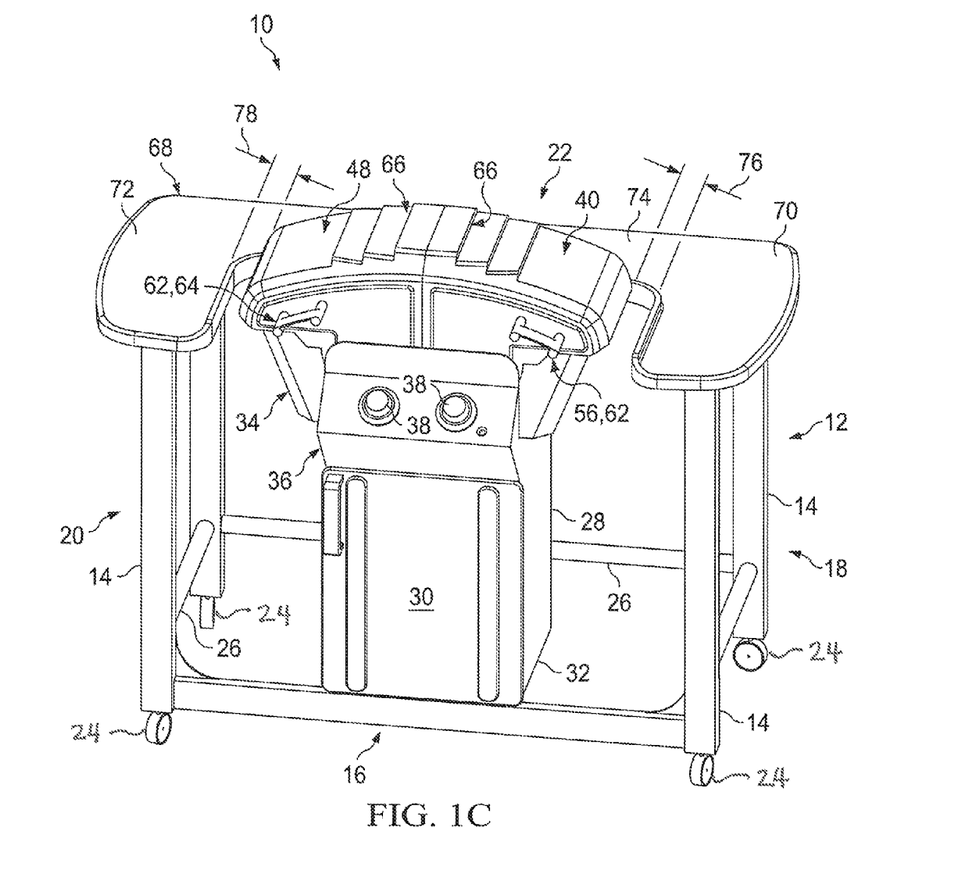
FIG. 1C is a perspective view of a third embodiment of the grill of the invention in a "lid closed" configuration.
Figure 2A:
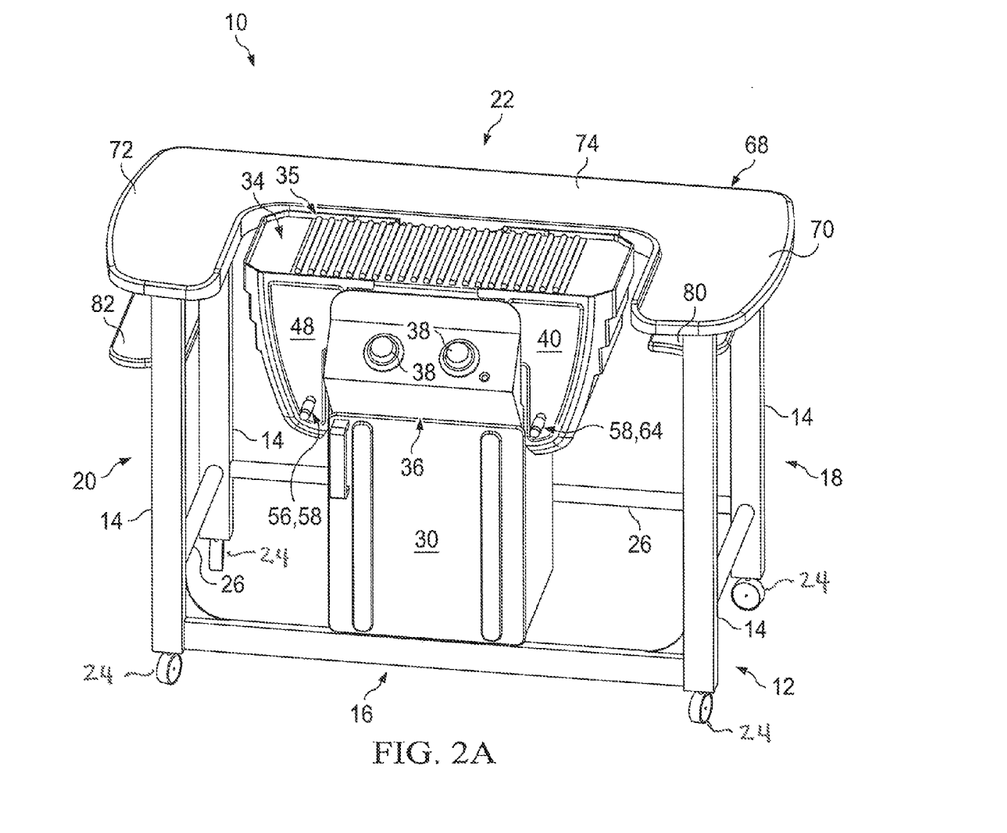
FIG. 2A is a perspective view of the embodiment of FIG. 1A shown in a "lid opened" configuration.
Figure 2B:
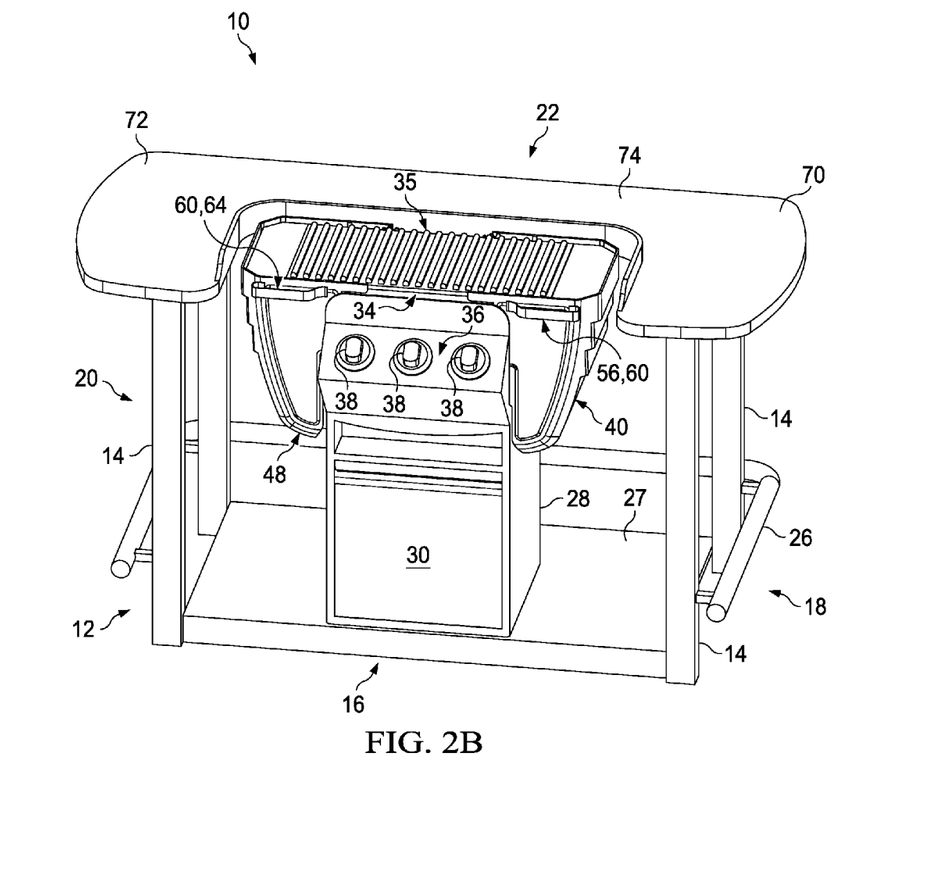
FIG. 2B is a perspective view of the embodiment of FIG. 1B shown in a "lid opened" configuration.
Figure 3:
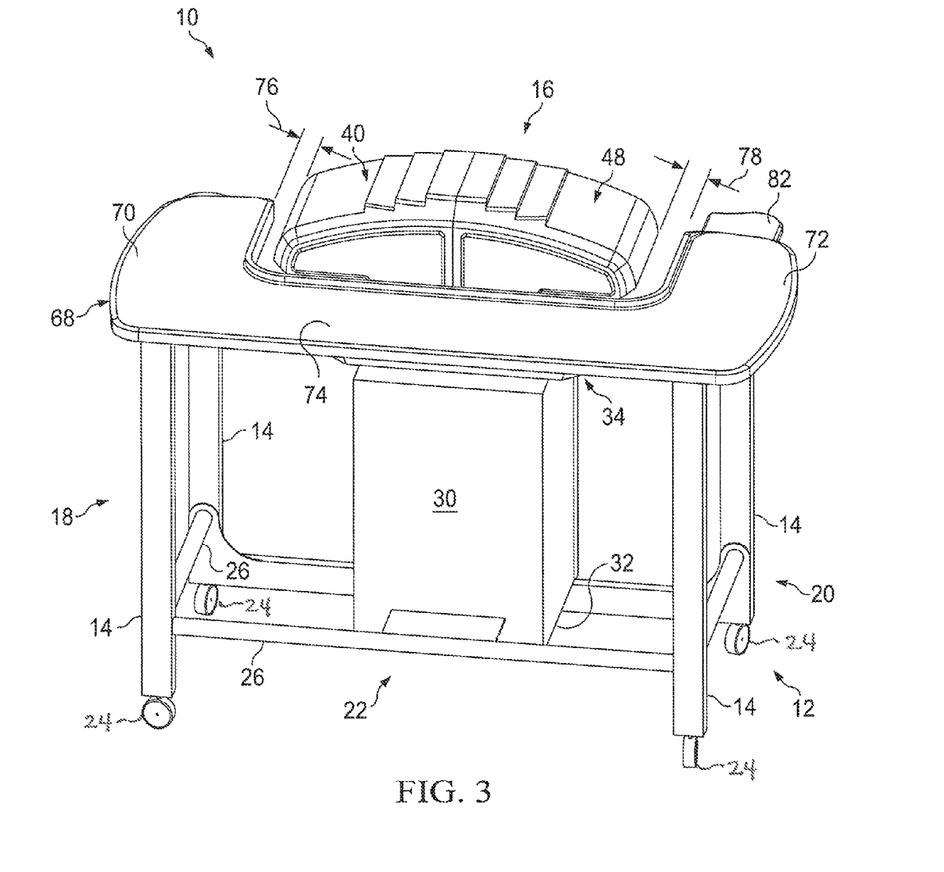
FIG. 3 is a rear perspective view of the embodiment of FIG. 1A shown in a "lid closed" configuration.

A base plate 27 may be provided in communication with a lower portion of legs 14 as shown in FIGS. 1B, 2B. A cabinet 30 is located within legs 14 of base 12. Cabinet 30 rests upon support members 32 (best seen in FIGS. 1C, 3 and 4), or alternatively, may rest on base plate 27 (FIGS. 1B, 2B).

Figure 4:
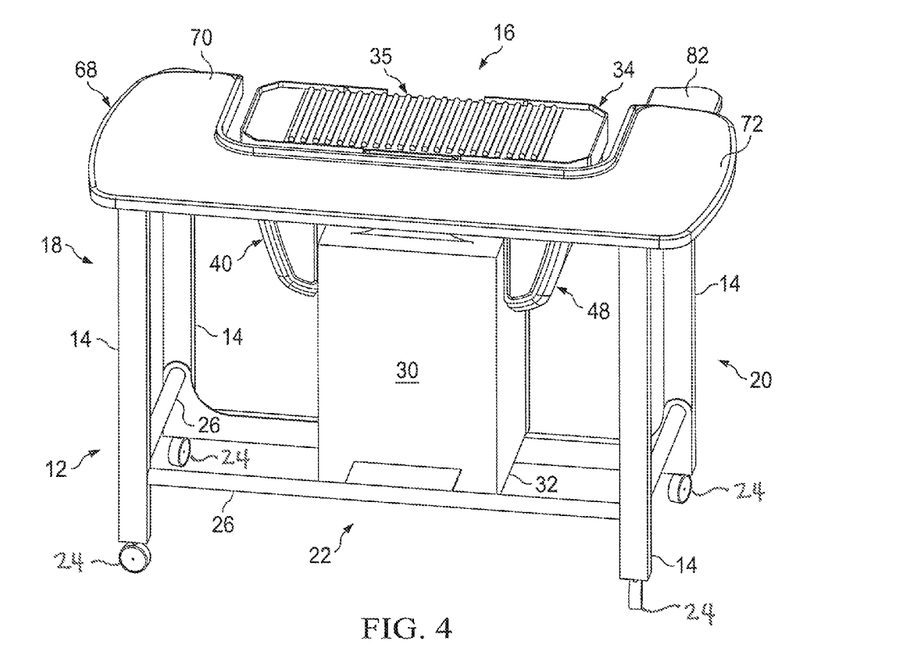
FIG. 4 is a rear perspective view of the embodiment of FIG. 1A shown in a "lid opened" configuration.

Grill body 34 is supported on an upper surface or support member 28 of cabinet 30. Grill body 34 houses a grate 35 (FIGS. 2A, 2B, 4). Grate 35 is preferably of the type and construction to achieve flare up suppression. Control panel 36 is provided on a front of cabinet 30 proximate an upper surface of cabinet 30. Controls 38 are provided on control panel 36.

Figure 5:
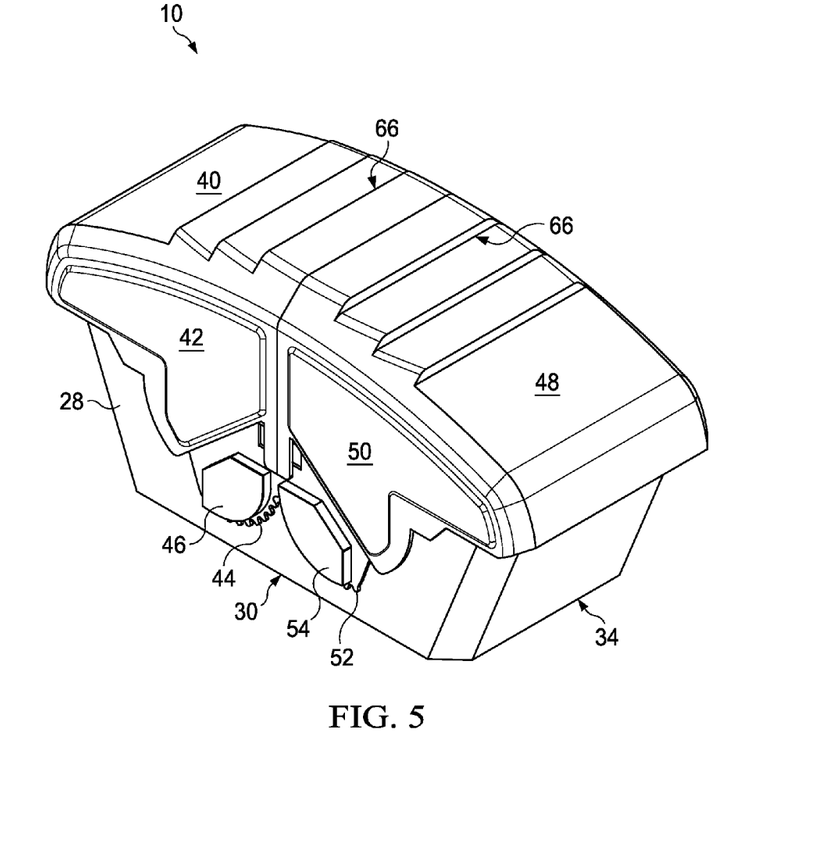
FIG. 5 is a rear perspective view of the grill body of the embodiment of FIG. 1A, showing mating gears and counterweights.

Right lid 40 is hingedly affixed to a right side of grill body 34. Right lid 40 has a right lower back portion 42 (FIG. 5). Right lower back portion 42 defines a right gear face 44. Additionally, a right counterweight 46 is affixed to right lower back portion 42. A left lid 48 is hingedly affixed to a left side of grill body 34. Left lid 48 has a left lower back portion 50 (FIG. 5). Left lower back portion 50 defines a left gear face 52 and has a left counterweight 54 attached thereto.

A right handle 56 extends from a front of right lid 40. Right handle 56 may be in the form of a post 58 (FIGS. 1A, 2A), a substantially vertical handle 60 (FIGS. 1B, 2B), or a substantially horizontal handle 62 (FIG. 1C) or may be provided in other configurations or orientations. A left handle 64 also extends from a front of left lid 48. Left handle 64 may also take the form of a post 58, a substantially vertical handle 60, or a substantially horizontal handle 62.

Each of right lid 40 and left lid 48 define a plurality of vents 66 (FIGS. 1A, 1B, 1C, 3 and 5) on an upper surface. Shelf 68 is supported on upper ends of legs 14. Shelf 68 substantially surrounds grill body 34. Shelf 68 defines a right portion 70, a left portion 72, and a rear portion 74.

Right portion 70 of shelf 68 and grill body 34 define a right retracting space 76 (FIGS. 1A, 1B, 1C, 3). Left portion 72 of shelf 68 and grill body 34 define a left retracting space 78 therebetween.

A right lower shelf 80 (FIGS. 1A, 2A) may be provided to extend from right side 18 of base 12 below right portion 70 of shelf 68. A left lower shelf 82 (FIGS. 1A, 2A, 3, 4) may be provided to extend from left side 20 of base 12 below left portion 72 of shelf 68.

In use, right lid 40 may be pivoted toward the right side of grill body 34 where right lid 40 is received within right retracting space 76 so that right lid 40 may be positioned into a retracted position. Left lid 48 may be pivoted toward a left side of grill body 34 where left lid 48 is received within left retracting space 78 so that left lid 48 may be positioned into a retracted position. In a preferred embodiment, when right lid 40 and left lid 48 are positioned in a retracted position, the uppermost portions of right lid 40 and left lid 48 and the uppermost surface of grill body 34 are substantially even with or below an upper surface of shelf 68.

Figure 6:
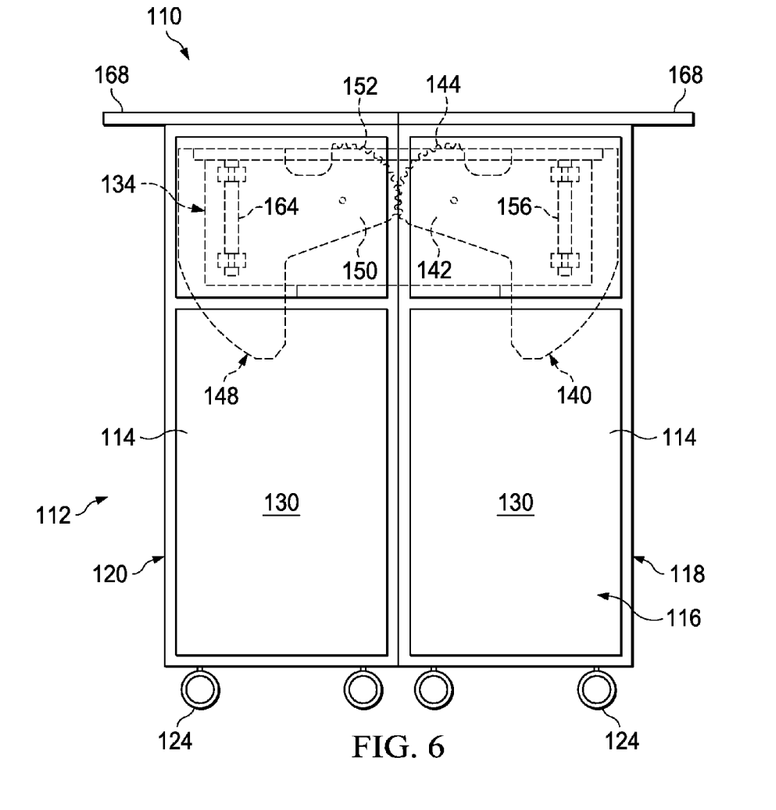
FIG. 6 is a front schematic view of an alternate embodiment of the grill of the invention having a construction consisting of sliding elements in a "cart closed/lids opened" configuration.
Figure 7:
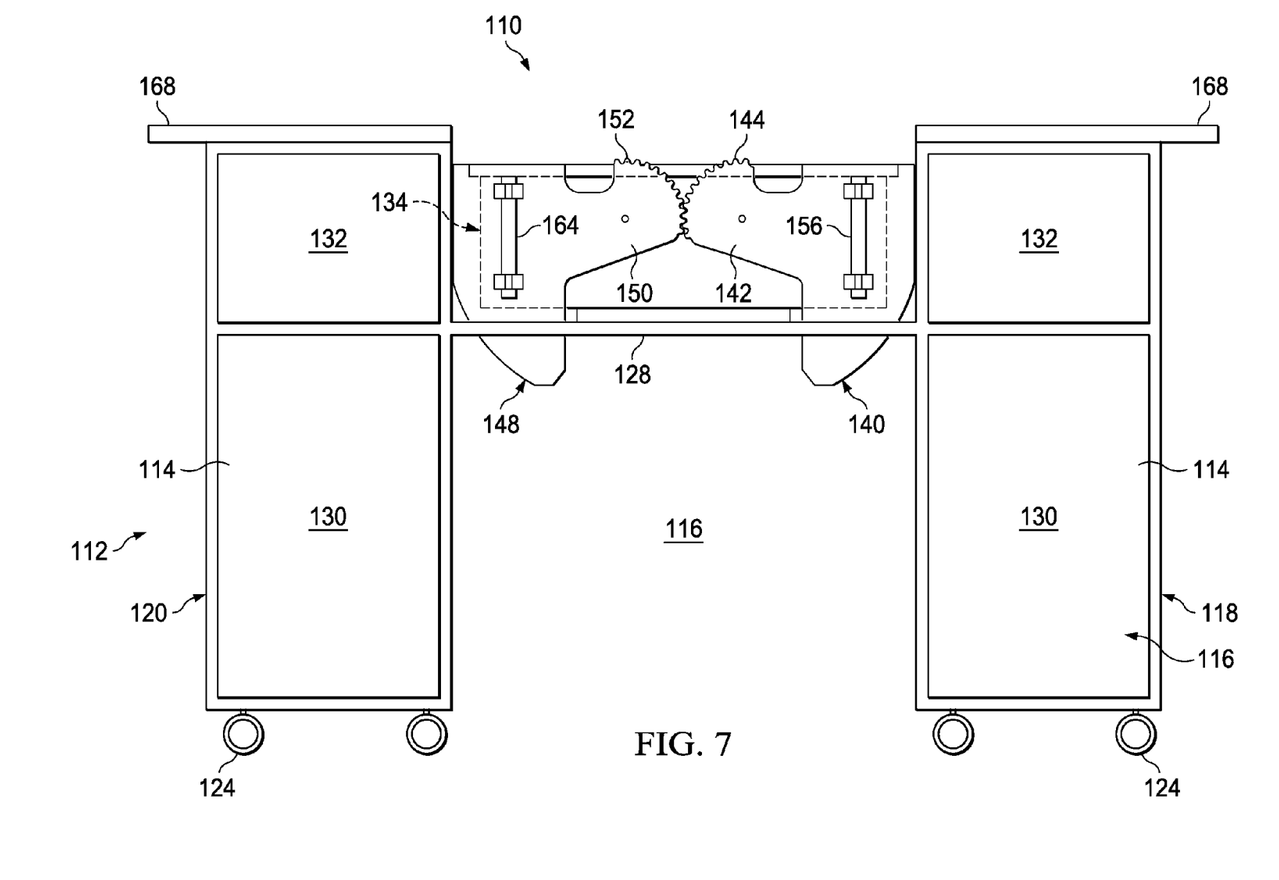
FIG. 7 is front schematic view of the grill of FIG. 6 showing the grill in a "cart opened/lids open" configuration.
Figure 8:
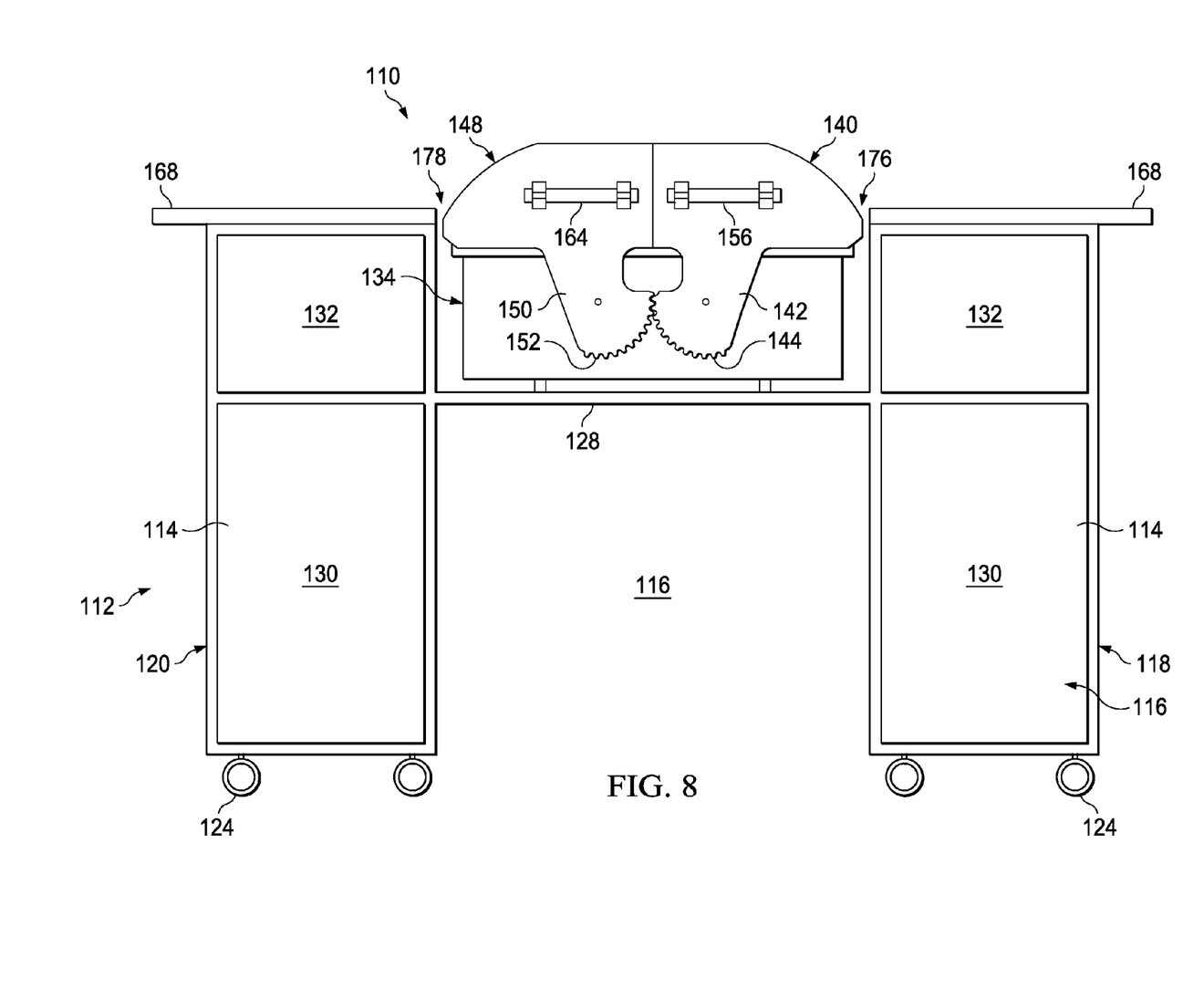
FIG. 8 is a front schematic view of the grill of FIG. 6 showing the grill in a "cart opened/lid closed" configuration.

Referring now to FIGS. 6-8, shown is an additional embodiment of the grill of the invention, designated generally 110. Grill 110 includes a base 112 having slidably mounted vertical structures 114. The base 112 has an operator side or front side 116, a right side 118, a left side 120, and a spectator side or rear side. Casters 124 are preferably affixed to the bottom of structures 114 to facilitate horizontal movement into a "cart closed" position (FIG. 6) and a "cart opened" position (FIGS. 7, 8).

A support member 128 may be provided in sliding communication with structures 114 as shown in FIGS. 7 and 8. Structures 114 may define cabinet portions 130 below support member 128. Structures 114 also define receiving areas 132 above cabinet portions 130. Grill body 134 is supported on support member 128 of cabinets 130.

Right lid 140 is hingedly affixed to grill body 134. Right lid 140 has a right lower back portion 142. Right lower back portion 142 defines a right gear face 144. Additionally, a right counterweight may be affixed to right lower back portion 142. A left lid 148 is hingedly affixed to grill body 134. Left lid 148 has a left lower back portion 150 (FIG. 5). Left lower back portion 150 defines a left gear face 152 and may have a left counterweight attached thereto.

A right handle 156 extends from a front of right lid 140. Right handle 156 may be in the form of a post 58 (FIGS. 1A, 2A), a substantially vertical handle 60 (FIGS. 1B, 2B), or a substantially horizontal handle 62 (FIG. 1C), 164 (FIGS. 6-8) or may be provided in other configurations or orientations. A left handle 164 also extends from a front of left lid 148. Left handle 164 may also take the form of a post 58, a substantially vertical handle 60, or a substantially horizontal handle 62, 164.

Each of right lid 140 and left lid 148 may define a plurality of vents. Shelf 168 is supported on upper ends of structures 114. Shelf 168 defines a right portion that rests on right cabinet 130 and a left portion that rests on left cabinet 130.

Right portion of shelf 168 and grill body 134 define a right retracting space 176 (FIG. 8). Left portion of shelf 168 and grill body 134 define a left retracting space 178 therebetween.

In use, right lid 140 may be pivoted toward the right side of grill body 134 where right lid 140 is received within right retracting space 176 so that right lid 140 may be positioned into a retracted position. Left lid 148 may be pivoted toward a left side of grill body 134 where left lid 148 is received within left retracting space 178 so that left lid 148 may be positioned into a retracted position. In a preferred embodiment, when right lid 140 and left lid 148 are positioned in a retracted position, the uppermost portions of right lid 140 and left lid 148 and the uppermost surface of grill body 134 are substantially even with or below an upper surface of shelf 168. When right lid 140 and left lid 148 are in a retracted position (FIGS. 6, 7), cabinet portions 130 may be slid together so that right and left portions of shelf 168 abut one another to form a work surface and to cover open grill body 134.

Figure 9:
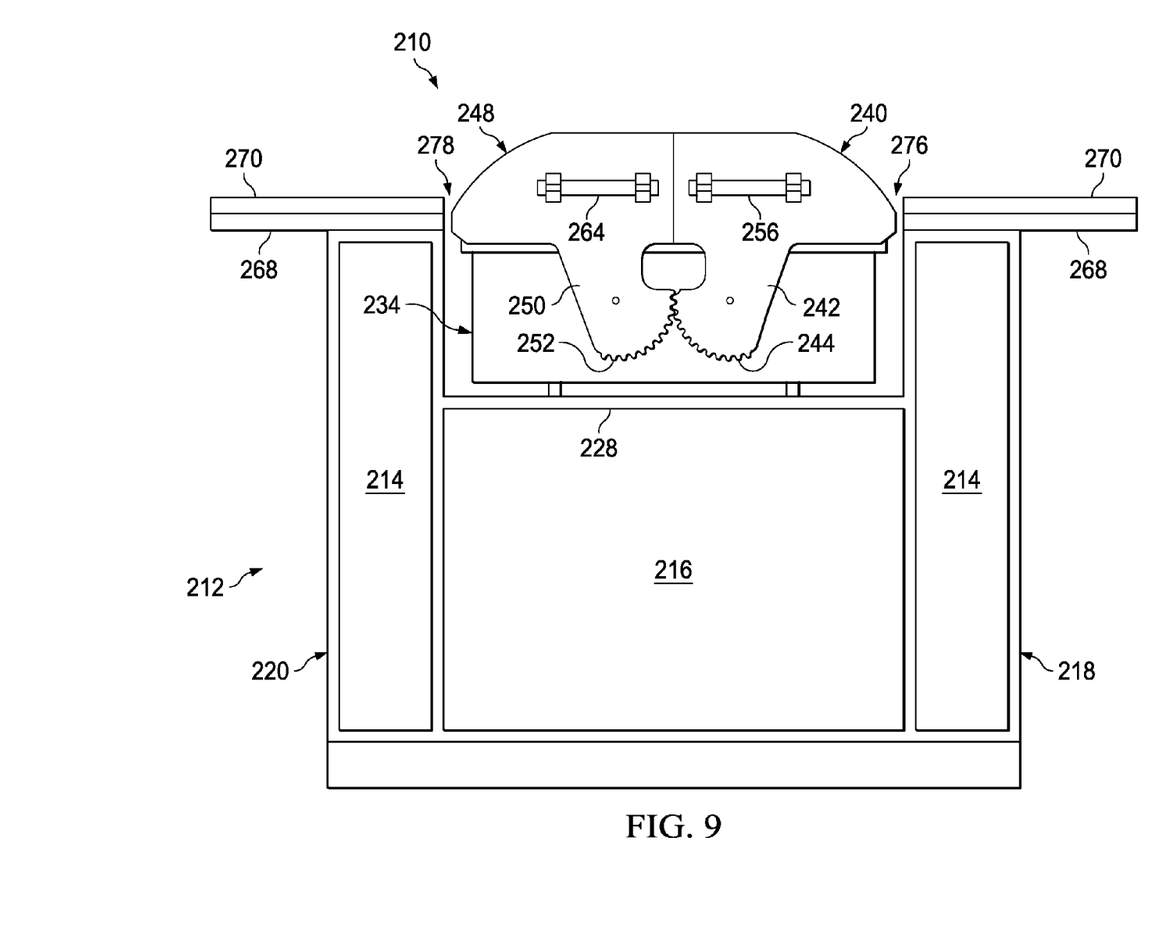
FIG. 9 is a front schematic view of an alternate embodiment of the grill of the invention having a construction consisting of folding shelves wherein the grill is shown in a "lids closed/shelves opened" configuration.
Figure 10:
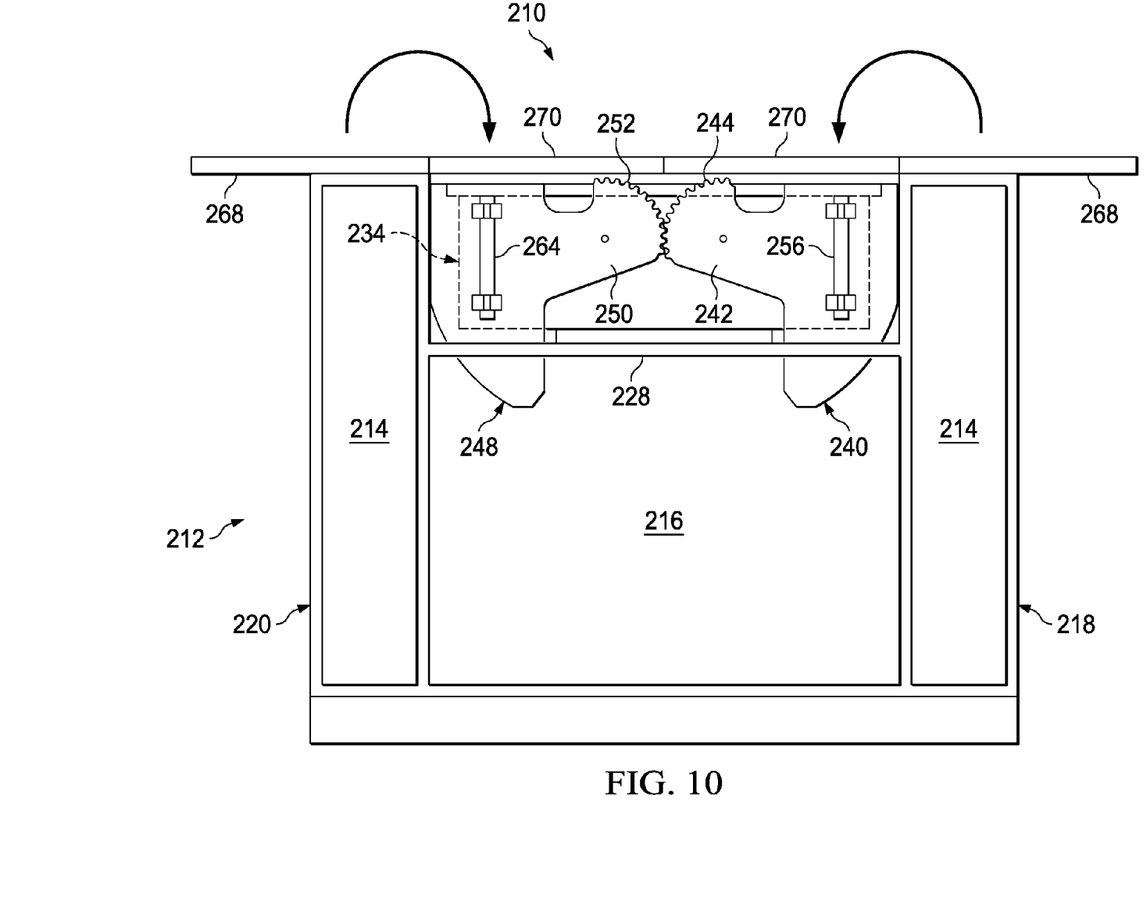
FIG. 10 is front schematic view of the grill of FIG. 9 shown in a "lids open/shelves closed" configuration.

Referring now to FIGS. 9 and 10, shown is an additional embodiment of the grill of the invention, designated generally 210. Grill 210 includes a base 212 having vertical structures 214. The base 212 has an operator side or front side 216, a right side 218, a left side 220, and a spectator side or rear side. A support member 228 is supported by structures 214 as shown in FIGS. 9 and 10. Grill body 234 rests on support member 228.

Right lid 240 is hingedly affixed to grill body 234. Right lid 240 has a right lower back portion 242. Right lower back portion 242 defines a right gear face 244. Additionally, a right counterweight may be affixed to right lower back portion 242.

A left lid 248 is hingedly affixed to grill body 234. Left lid 248 has a left lower back portion 250. Left lower back portion 250 defines a left gear face 252 and may have a left counterweight attached thereto.

A right handle 256 extends from a front of right lid 240. Right handle 256 may be in the form of a post 58 (FIGS. 1A, 2A), a substantially vertical handle 60 (FIGS. 1B, 2B), or a substantially horizontal handle 62 (FIG. 1C), 162 (FIGS. 6-8) or may be provided in other configurations or orientations. A left handle 264 also extends from a front of left lid 248. Left handle 264 may also take the form of a post 58, a substantially vertical handle 60, or a substantially horizontal handle 62, 162.

Each of right lid 240 and left lid 248 may define a plurality of vents. Outer shelf 268 is supported on upper ends of structures 214. Inner shelf 270 is hingedly affixed to outer shelf 268. Inner shelf 270 may be configured in an open position (FIG. 9) or in a closed position (FIG. 10).

Right portion of outer shelf 268 and grill body 234 define a right retracting space 276 (FIG. 9). Left portion of outer shelf 268 and grill body 234 define a left retracting space 278 therebetween.

In use, right lid 240 may be pivoted toward the right side of grill body 234 where right lid 240 is received within right retracting space 276 so that right lid 240 may be positioned into a retracted position (FIG. 10). Left lid 248 may be pivoted toward a left side of grill body 234 where left lid 248 is received within left retracting space 278 so that left lid 248 may be positioned into a retracted position. In a preferred embodiment, when right lid 240 and left lid 248 are positioned in a retracted position, the uppermost portions of right lid 240 and left lid 248 and the uppermost surface of grill body 234 are substantially even with or below an upper surface of left and right structures 214 as shown in FIG. 10. When inner shelf segments 270 are in a closed position (FIG. 10), outer shelf segments 268 and inner shelf segments 270 form a work surface and inner shelf segments 270 serve to cover open grill body 234.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A grill comprising:
a grill body having a front side, a right side, a left side and a rear side;
a shelf adjacent to said grill body;
a first lid pivotally affixed to said grill body;
a second lid pivotally affixed to said grill body;
said first lid and said second lid are mechanically linked to ensure synchronized movement from an open position to a closed position; and
wherein said first lid and said second lid are completely below a plane defined by an upper surface of said shelf when said first lid and said second lid are in said open position;
said shelf has a right portion adjacent to said right side of said grill body, a left portion adjacent to said left side of said grill body, and a rear portion adjacent to said rear side of said grill body; and
said grill body and said right portion of said shelf define a right retracting space therebetween;
said grill body and said left portion of said shelf define a left retracting space therebetween;
said first lid is received within said right retracting space when said first lid is pivoted to said open position;
said second lid is received within said left retracting space when said second lid is pivoted to said open position.

* * * * *